United States Patent
Morihara et al.

(10) Patent No.: US 12,473,651 B2
(45) Date of Patent: Nov. 18, 2025

(54) ORNAMENT AND SILVER MIRROR FILM-FORMING LIQUID

(71) Applicant: Showa Denko Materials Co., Ltd., Tokyo (JP)

(72) Inventors: Masumi Morihara, Tagawa (JP); Masahiro Iwanaga, Tagawa (JP); Toshiki Shirahama, Tagawa (JP); Hiroaki Fujino, Tagawa (JP); Hirofumi Shiokawa, Tagawa (JP); Kentarou Watanabe, Tokyo (JP); Shingo Hanawa, Tokyo (JP); Yoshihiro Tsuda, Tokyo (JP)

(73) Assignee: Resonac Corporation, Tokyo (JP)

( * ) Notice: Subject to any disclaimer, the term of this patent is extended or adjusted under 35 U.S.C. 154(b) by 693 days.

(21) Appl. No.: 17/611,635

(22) PCT Filed: Jun. 19, 2020

(86) PCT No.: PCT/JP2020/024192
§ 371 (c)(1),
(2) Date: Nov. 16, 2021

(87) PCT Pub. No.: WO2020/256127
PCT Pub. Date: Dec. 24, 2020

(65) Prior Publication Data
US 2022/0220616 A1    Jul. 14, 2022

(30) Foreign Application Priority Data

Jun. 21, 2019 (WO) ................ PCT/JP2019/024748

(51) Int. Cl.
*B60R 13/00* (2006.01)
*C09D 1/00* (2006.01)
(Continued)

(52) U.S. Cl.
CPC ............ *C23C 18/44* (2013.01); *B60R 13/005* (2013.01); *C09D 1/00* (2013.01); *C09D 7/63* (2018.01)

(58) Field of Classification Search
None
See application file for complete search history.

(56) References Cited

U.S. PATENT DOCUMENTS 3,801,325 A    4/1974  Rasch
2002/0142149 A1  10/2002  Nakashima et al.
(Continued)

FOREIGN PATENT DOCUMENTS

JP    2003-019765 A    1/2003
JP    2005-220413 A    8/2005
(Continued)

OTHER PUBLICATIONS

Machine translation of JP2017088923 via EPO/Espacenet translated Jul. 30, 2024 (Year: 2017).*

(Continued)

*Primary Examiner* — Elizabeth Collister
(74) *Attorney, Agent, or Firm* — Fitch, Even, Tabin & Flannery LLP

(57) ABSTRACT

An ornament includes a base material; and a silver particle layer containing silver particles and disposed on the base material, wherein the silver particle layer has surface resistivity of $10^4 \Omega/\square$ or more, and the silver particles are stacked in the silver particle layer in a thickness direction of the silver particle layer.

14 Claims, 1 Drawing Sheet

(51) Int. Cl.
*C09D 7/63* (2018.01)
*C23C 18/44* (2006.01)

(56) References Cited

U.S. PATENT DOCUMENTS

2019/0194479 A1* 6/2019 Hara ........................ B32B 27/08
2020/0157685 A1* 5/2020 Kitamoto ............ C23C 18/1204

FOREIGN PATENT DOCUMENTS

| | | |
|---|---|---|
| JP | 2006-274400 A | 10/2006 |
| JP | 2007-197743 A | 8/2007 |
| JP | 2010-100006 A | 5/2010 |
| JP | 2012-082444 A | 4/2012 |
| JP | 2013-249525 A | 12/2013 |
| JP | 2017-088923 A | 5/2017 |
| JP | 2017-191736 A | 10/2017 |
| WO | 2018/179579 A1 | 10/2018 |
| WO | WO-2019187328 A1 * | 10/2019 |

OTHER PUBLICATIONS

Machine translation of WO2019187328A1 via the EPO, translated Feb. 4, 2024 (Year: 2019).*

Dictionary definition; Cambridge Dictionary, https://dictionary.cambridge.org/us/dictionary/english/stacked, accessed Feb. 4, 2024 ( Year: 2025).*

* cited by examiner

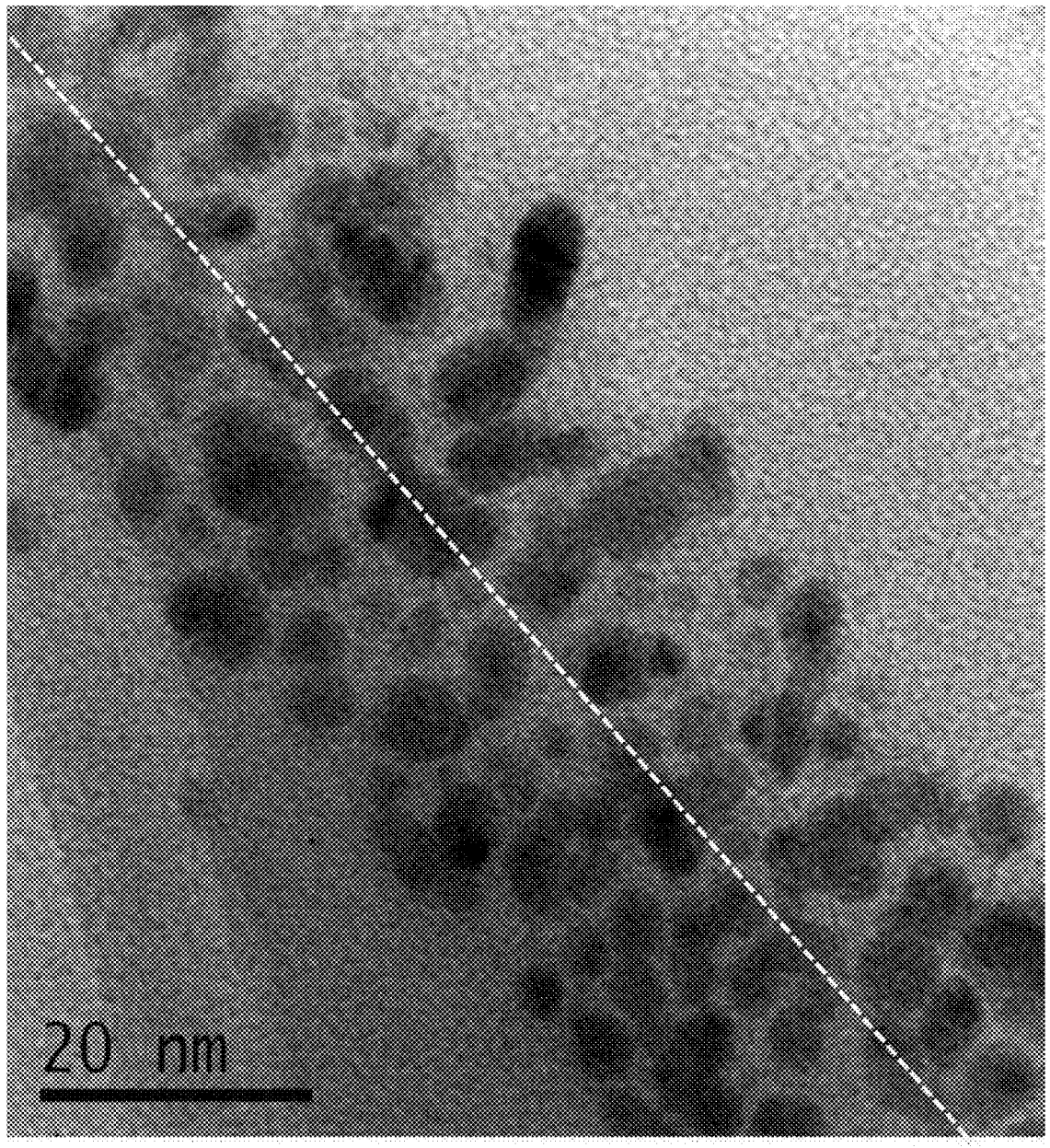

ORNAMENT AND SILVER MIRROR FILM-FORMING LIQUID

CROSS-REFERENCE TO RELATED APPLICATIONS

This application is a U.S. national phase application filed under 35 U.S.C. § 371 of International Application No. PCT/JP2020/024192, filed Jun. 19, 2020, designating the United States, which claims priority from International Application No. PCT/JP2019/024748, filed Jun. 21, 2019, the entire contents of each of which are hereby incorporated herein by reference.

TECHNICAL FIELD

The present disclosure relates to an ornament and a silver mirror film-forming liquid.

BACKGROUND ART

In recent years, there have been outstanding developments in safety devices for vehicles. For example, vehicles equipped with automatic collision avoidance systems have become common.

An automatic collision avoidance system automatically applies a brake using image data obtained by an in-vehicle camera and information associated with a relative distance to an object obtained by millimeter wave radars.

A transceiver for millimeter wave radars included in an automatic collision avoidance system is desirably disposed in the center of the forward part of a vehicle. The center of the forward part of a vehicle generally has an emblem of the vehicle. Therefore, it is desirable to place a transceiver for millimeter wave radars behind an emblem of a vehicle.

As described in Japanese Patent Application Laid-Open (JP-A) No. 2003-019765, for example, an emblem or the like of a vehicle is often formed by disposing a metallic coating film such as silver plating on a base material including resin or the like.

Furthermore, Japanese Patent Application Laid-Open (JP-A) No. 2010-100006 discloses a method for forming a cover of a millimeter wave radar device for a vehicle. In the method, a metal film including indium or the like and having a sea-island structure is formed on a surface of a resin component.

SUMMARY OF INVENTION

Technical Problem

An ornament obtained by applying silver plating or the like on a base material does not always allow millimeter wave radars to pass therethrough.

On the other hand, a metal layer having a sea-island structure dotted with island-shaped indium allows millimeter wave radars to pass therethrough. However, indium is a kind of rare metal and is expensive, supplied unstably, and not suitable for mass production.

Therefore, there is demand for development of an ornament having a metal layer that allows passage of millimeter wave radars.

The present disclosure has been made in light of the circumstances in the related art, and an object of an embodiment of the disclosure is to provide an ornament having excellent millimeter wave radar transmittance. An object of another embodiment of the disclosure is to provide a silver mirror film-forming liquid that forms an ornament having excellent millimeter wave radar transmittance.

Solution to Problem

Specific means for achieving the above-mentioned problems are as follows.

<1> An ornament comprising:
a base material; and
a silver particle layer containing silver particles and disposed on the base material,
wherein the silver particle layer has surface resistivity of $10^4 \Omega/\square$ or more, and
the silver particles are stacked in the silver particle layer in a thickness direction of the silver particle layer.

<2> An ornament comprising:
a base material; and
a silver particle layer containing silver particles and disposed on the base material,
wherein the silver particle layer has surface resistivity of $10^7 \Omega/\square$ or more.

<3> The ornament according to <1> or <2>, wherein tin is present between the base material and the silver particles.

<4> The ornament according to any one of <1> to <3>, wherein the silver particles account for 95% or less of the silver particle layer.

<5> The ornament according to any one of <1> to <4>, wherein the silver particles contain precipitated silver particles.

<6> A silver mirror film-forming liquid comprising:
a water-soluble silver salt solution containing a water-soluble silver salt, ammonia, an amine compound, and an additive; and
a reducing agent aqueous solution containing a reducing agent and a strong alkaline component.

<7> The silver mirror film-forming liquid according to <6>, wherein the additive contains a compound having a phosphate structure.

<8> The silver mirror film-forming liquid according to <7>, wherein the compound having a phosphate structure contains an esterified product of a compound represented by the following Formula (I) and phosphoric acid:

wherein, in Formula (I), R represents a straight or branched alkyl group having from 10 to 20 carbon atoms, and n is an integer of 1 or 2 or more.

Advantageous Effects of Invention

According to an embodiment of the disclosure, there is provided an ornament having excellent millimeter wave radar transmittance. According to another embodiment of the disclosure, there is provided a silver mirror film-forming liquid that forms an ornament having excellent millimeter wave radar transmittance.

BRIEF DESCRIPTION OF DRAWINGS

FIG. 1 shows an example of an electron micrograph of a cross-section of a base material formed with a silver particle layer obtained in Example 1.

DESCRIPTION OF EMBODIMENTS

Embodiments of the disclosure are described below in detail. It is noted here, however, that the disclosure is not restricted to the below-described embodiments. In the below-described embodiments, the constituents thereof (including element steps and the like) are not indispensable unless otherwise specified. The same applies to the numerical values and ranges thereof, without restricting the disclosure.

In the disclosure, those numerical ranges that are expressed with "to" each denote a range that includes the numerical values stated before and after "to" as the minimum value and the maximum value, respectively.

In a set of numerical ranges that are stated stepwisely in the disclosure, the upper limit value or the lower limit value of a numerical range may be replaced with the upper limit value or the lower limit value of other numerical range. Further, in a numerical range stated in the disclosure, the upper limit or the lower limit of the numerical range may be replaced with a relevant value indicated in any of Examples.

In the disclosure, a component may include a plurality of different substances corresponding thereto. When there are plural kinds of substances that correspond to a component of a composition, the indicated content ratio or content amount of the component in the composition means, unless otherwise specified, the total content ratio or content amount of the plural kinds of substances existing in the composition.

In the disclosure, particles corresponding to a component may include a plurality of different kinds of particles. When there are plural kinds of particles that correspond to a component of a composition, the indicated particle size of the component in the composition means, unless otherwise specified, a value determined for a mixture of the plural kinds of particles existing in the composition.

In the disclosure, the term "layer" or "film" includes, when observing a region where a layer or film is present, a case in which the layer or the film is formed only on a part of the region in addition to a case in which the layer or the film is formed on the entirety of the region.

In the disclosure, a test piece is prepared from an object of interest using a microtome or the like, and thicknesses at any five positions are measured with an electron microscope. Herein, the arithmetic average of the measured thicknesses represents the thickness of each layer.

<Ornament>

A first ornament of the disclosure includes a base material and a silver particle layer containing silver particles and disposed on the base material, in which the silver particle layer has surface resistivity of $10^4 \Omega/\square$ or more, and the silver particles are stacked in the silver particle layer in a thickness direction of the silver particle layer.

In addition, a second ornament of the disclosure includes a base material and a silver particle layer containing silver particles and disposed on the base material, in which the silver particle layer has surface resistivity of $10^7 \Omega/\square$ or more.

Hereinafter, the first ornament and the second ornament of the disclosure may be collectively referred to as "ornament of the disclosure".

The ornament of the disclosure is excellent in millimeter wave radar transmittance. The reason is not clear, but is presumed as follows.

In the first ornament of the disclosure, the silver particle layer containing silver particles and disposed on the base material has surface resistivity of $10^4 \Omega/\square$ or more, and the silver particles are stacked in the silver particle layer in the thickness direction of the silver particle layer. Accordingly, adequate amounts of voids are easily formed between the silver particles included in the silver particle layer.

Similarly, in the second ornament of the disclosure, the silver particle layer containing silver particles and disposed on the base material has surface resistivity of $10^7 \Omega/\square$ or more. Accordingly, adequate amounts of voids are easily formed between the silver particles included in the silver particle layer.

Millimeter wave radar transmittance is ensured by millimeter wave radars passing through the voids between the silver particles. Therefore, it is presumed that the ornament of the disclosure is excellent in millimeter wave radar transmittance.

Hereinafter, each member included in the ornament of the disclosure will be described. The ornament of the disclosure includes a base material and a silver particle layer and may have other layers, if necessary.

—Base Material—

The ornament of the disclosure includes the base material.

The base material is not particularly limited in material and may employ inorganic materials such as glass and organic materials such as resin. Examples of the resin include thermosetting resin and thermoplastic resin.

Examples of the thermoplastic resin include polyethylene, polypropylene, polycarbonate, polystyrene, polyvinyl chloride, vinyl-type polymers, polyester, polyamide, acrylonitrile-butadiene-styrene copolymer resin (ABS resin), polyester, and thermoplastic elastomers.

Examples of the thermosetting resin include silicone resin, polyurethane resin, polyester resin, melamine resin, epoxy resin, phenol resin, and urea resin.

In a case where the ornament is used for a vehicle part such as an emblem, for example, polypropylene, polycarbonate, or an ABS resin is preferably used as a material of the base material. Among resins, polypropylene has a low specific gravity and is tractable and also has high tensile strength, impact strength, and compressive strength. What is more, polypropylene has excellent weather resistance and heat resistance. ABS resin is a resin that relatively easily enables surface treatment among plastic materials, and thus, easily enables coating or the like after molding of a base material. Furthermore, ABS resin is excellent in chemical resistance and rigidity and also excellent in impact resistance, heat resistance, and cold resistance. Polycarbonate has high impact resistance and is excellent in weather resistance, heat resistance, and transparency among plastic materials. Polycarbonate is also tractable and is a relatively light and sturdy material among plastic materials.

The thickness of the base material can be appropriately designed depending on the intended use of the ornament. Furthermore, the base material is not particularly limited in shape.

—Silver Particle Layer—

The ornament of the disclosure includes the silver particle layer containing silver particles.

The silver particle layer may be formed by a silver mirror reaction. In addition, the silver particles contained in the silver particle layer may contain silver particles precipitated by a silver mirror reaction (precipitated silver particles). Furthermore, the silver particle layer may have a sea-island structure dotted with island-shaped silver particles.

In the silver particle layer included in the first ornament, the silver particles are stacked in the silver particle layer in a thickness direction of the silver particle layer. On the other hand, in the silver particle layer of the second ornament, the silver particles may or may not be stacked in the silver particle layer in the thickness direction of the silver particle layer.

In forming the silver particle layer by a silver mirror reaction, two solutions, that is, a water-soluble silver salt aqueous solution and a reducing agent aqueous solution containing a reducing agent and a strong alkaline component, are applied to a surface of the base material or a surface of an undercoat layer to be described later (hereinafter the surfaces of the base material and the undercoat layer may be collectively referred to as "silver-mirror-reaction surface") in such a manner that the two solutions are mixed with each other. Accordingly, an oxidation-reduction reaction occurs to generate silver particles, thereby forming the silver particle layer.

The water-soluble silver salt aqueous solution used for forming the silver particle layer is obtained by dissolving a water-soluble silver salt (such as silver nitrate), ammonia, and at least one amine compound selected from the group consisting of an amino alcohol compound, an amino acid, and an amino acid salt in water.

Specific examples of the amine compound include amino alcohol compounds such as monoethanolamine, diethanolamine, diisopropanolamine, triethanolamine, and triisopropanolamine; amino acids and salts thereof such as glycine, alanine, and glycine sodium salt.

The water-soluble silver salt (such as silver nitrate), ammonia, and amine compound contained in the water-soluble silver salt aqueous solution are not particularly limited in amount.

The water-soluble silver salt aqueous solution may contain another component such as an additive, if necessary.

The additive is not particularly limited in type, and one known in the related art such as a surfactant may be employed. Examples of the surfactant include compounds having a "hydrophilic" moiety and a "lipophilic" moiety in one molecule, and it is possible to employ a material commercially available as a surfactant.

Examples of the additive include anionic compounds, cationic compounds, nonionic compounds, amphoteric compounds, and polyvalent carboxylic acids.

Examples of the hydrophilic moiety contained in an anionic compound include a carboxy group (COO), a sulfonic acid group ($SO_3^-$), a sulfate structure, and a phosphate structure. Examples of the hydrophilic moiety contained in a cationic compound include an amine salt structure and a quaternary ammonium salt ($NR_4^+$) structure. Examples of the hydrophilic moiety contained in a nonionic compound include an ethylene oxide addition polymer (PEO) structure and a polyol structure. An amphoteric compound contains the hydrophilic moiety contained in an anionic compound and the hydrophilic moiety contained in a cationic compound in one molecule. An amphoteric compound may exhibit either anionic or cationic properties depending on pH.

The additive is preferably an anionic compound and more preferably a compound having a phosphate structure.

The compound having a phosphate structure preferably contains an esterified product of a compound represented by the following Formula (I) and phosphoric acid.

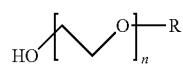

(I)

In Formula (I), R is a straight or branched alkyl group having from 10 to 20 carbon atoms, and preferably, a straight or branched alkyl group having from 10 to 15 carbon atoms. The symbol n represents 1 or an integer of 2 or more.

Specific examples of R include straight alkyl groups such as n-decyl group, n-dodecyl group, n-pentadecyl group, and n-eicosyl group, and an isoalkyl group represented by $(CH_3)_2CH—(CH_2)_m—$ (m is an integer of 7 to 17).

The compound having a phosphate structure more preferably contains an esterified product of a compound represented by the following Formula (IA) and phosphoric acid. In Formula (IA), n represents 1 or an integer of 2 or more, preferably 1 or 2, and more preferably 1.

(IA)

$$HO—(CH_2CH_2O)_n—CH_2CH_2CH_2CH_2CH_2CH_2CH_2CH_2CH_2\overset{\overset{\displaystyle CH_3}{|}}{C}HCH_3$$

An amount of the additive contained, if necessary, in the water-soluble silver salt aqueous solution is preferably from 0.05% by mass to 20% by mass, more preferably from 1% by mass to 10% by mass, and still more preferably from 1% by mass to 5% by mass.

The reducing agent aqueous solution used for forming the silver particle layer is obtained by dissolving a reducing agent and a strong alkaline component in water.

Specific examples of the reducing agent include: hydrazine compounds such as hydrazine sulfate, hydrazine carbonate, and hydrazine hydrate; sulfite compounds such as sodium sulfite; and thiosulfate compounds such as sodium thiosulfate.

Specific examples of the strong alkaline component include sodium hydroxide and potassium hydroxide.

The reducing agent aqueous solution may contain the aforementioned amine compound, if necessary.

The reducing agent aqueous solution may contain a compound containing a formyl group, if necessary. Specific examples of the compound containing a formyl group include glucose and glyoxal.

The reducing agent and the strong alkaline component, and also, the amine compound and the compound containing a formyl group contained, if necessary, in the reducing agent aqueous solution are not particularly limited in amount.

The reducing agent aqueous solution may contain an additive, if necessary. The additive to be used for the reducing agent aqueous solution is similar to one used for the water-soluble silver salt aqueous solution.

An amount of the additive contained, if necessary, in the reducing agent aqueous solution is preferably from 0.05% by mass to 20% by mass, more preferably from 1% by mass to 10% by mass, and still more preferably from 1% by mass to 5% by mass.

With regard to the method for applying the two solutions, the water-soluble silver salt aqueous solution and the reducing agent aqueous solution, to the silver-mirror-reaction surface in such a manner that the two solutions are mixed with each other, examples of the method include mixing the two kinds of aqueous solutions in advance and spraying the mixed solution onto the silver-mirror-reaction surface with a spray gun or the like; spraying using a concentric spray gun having a structure in which two kinds of aqueous solutions are mixed in the head of the spray gun and immediately ejected; spraying by ejecting the two kinds of aqueous solutions respectively from a dual head spray gun having two spray nozzles; and simultaneously spraying the two kinds of aqueous solutions with two separate spray guns. Any of these methods can be selected depending on circumstances.

When the silver particle layer is formed by a silver mirror reaction, surface activation may be performed on the silver-mirror-reaction surface before applying the two solutions, the water-soluble silver salt aqueous solution and the reducing agent aqueous solution. In the surface activation, a surface activation liquid containing an inorganic tin compound is applied to the silver-mirror-reaction surface so as to attach stannous ions to the silver-mirror-reaction surface. Then, on the silver-mirror-reaction surface subjected to the surface activation, the silver particle layer can be formed by a silver mirror reaction.

With regard to the treatment of the silver-mirror-reaction surface using the surface activation liquid containing an inorganic tin compound, examples of the treatment include immersion of the base material in the surface activation liquid, and application of the surface activation liquid to the silver-mirror-reaction surface on which the silver particle layer is to be formed. As a method for applying the surface activation liquid, it is preferable to employ spraying, which does not necessitate selection of the shape of the base material. After the surface activation, it is preferable to wash off the surface activation liquid excessively attached to the silver-mirror-reaction surface using deionized water or purified distilled water.

The surface activation liquid is obtained by dissolving an inorganic tin compound such as tin (II) chloride, tin (II) oxide, or tin (II) sulfate, and if necessary, hydrogen chloride, hydrogen peroxide, a polyhydric alcohol, or the like in water. These components contained in the surface activation liquid are not particularly limited in amount.

After the silver-mirror-reaction surface is treated with the surface activation liquid, before the silver particle layer is formed by a silver mirror reaction, activation with silver ions may be performed using a treatment liquid containing a water-soluble silver salt such as silver nitrate. The water-soluble silver salt in the treatment liquid used in the activation is not particularly limited in amount.

This treatment liquid is brought into contact with the silver-mirror-reaction surface treated with the surface activation liquid. For these processes of the activation, it is preferable to employ spraying, which does not necessitate selection of the shape of the base material.

After the silver particle layer is formed by a silver mirror reaction, a surface of the silver particle layer may be washed with deionized water, distilled water, or the like to remove the solutions or the like remaining on the surface after the silver mirror reaction.

Furthermore, in order to reduce the reaction activity between silver in the silver particle layer and residual ions such as chloride ions and sulfide ions, the silver particle layer may be treated with a deactivation liquid which is an aqueous solution containing a strong alkaline component such as potassium hydroxide and a sulfite such as sodium sulfite. For the deactivation, it is preferable to employ spraying, which does not necessitate selection of the shape of the base material.

After the silver particle layer is treated with the deactivation liquid, the surface of the silver particle layer may be washed with deionized water, distilled water, or the like to remove residues of the deactivation liquid remaining on the surface.

The strong alkaline component and sulfite contained in the deactivation liquid are not particularly limited in amount.

The silver particle layer is not particularly limited in thickness and preferably has a thickness of about from 30 nm to 200 nm.

When a cross section of the silver particle layer in the thickness direction is observed, the silver particles in the silver particle layer preferably account for 95% or less, more preferably 70% or less, and still more preferably from 60% to 65%. With 95% or less of the silver particles contained in the silver particle layer, the millimeter wave radar transmittance tends to be improved.

The proportion of the silver particles in the silver particle layer refers to a value measured in the following manner.

With regard to the silver particle layer in the ornament, a transmission electron micrograph of its cross section in the thickness direction is captured at 300,000-fold magnification. In the obtained electron micrograph, a center line passing through the center of the silver particle layer in the thickness direction is determined. Next, the length of portions where the center line and the silver particles overlap is determined. The length of the portions where the center line and the silver particles overlap is divided by the length of the entire center line, thereby obtaining a percentage. This percentage is defined as the proportion of the silver particles in the silver particle layer.

In the first ornament, the silver particle layer has surface resistivity of $10^4 \Omega/\square$ or more, preferably $10^5 \Omega/\square$ or more, and more preferably $10^6 \Omega/\square$ or more.

In the second ornament, the silver particle layer has surface resistivity of $10^7 \Omega/\square$ or more, preferably $2 \times 10^7 \Omega/\square$ or more, and more preferably $5 \times 10^7 \Omega/\square$ or more.

The upper limit of the surface resistivity of the silver particle layer is not particularly limited but may be $10^{10} \Omega/\square$ or less.

The surface resistivity of the silver particle layer refers to a value measured in accordance with JIS K 6911:2006.

The surface resistivity of the silver particle layer can be adjusted, for example, by adjusting the pH or a concentration of the water-soluble silver salt aqueous solution or the reducing agent aqueous solution or by adjusting the application time of the water-soluble silver salt aqueous solution and the reducing agent aqueous solution.

Tin may be present between the silver particles contained in the silver particle layer and the base material. The presence of tin between the silver particles and the base material tends to improve adhesion between the base material and the silver particles.

Tin present between the silver particles and the base material is supplied to the silver-mirror-reaction surface by the aforementioned surface activation.

—Undercoat Layer—

An undercoat layer may be disposed between the base material and the silver particle layer to enhance adhesion between the base material and the silver particle layer and to form a smooth surface on the base material.

In forming the undercoat layer, for example, fluororesin coating materials, polyester resin coating materials, epoxy resin coating materials, melamine resin coating materials, silicone resin coating materials, acrylic silicone resin coating materials, and acrylic urethane resin coating materials may be used. It is preferable to use acrylic silicone resin coating materials or acrylic urethane resin coating materials. Acrylic silicone resin coating materials have excellent adhesion to the base material and have high gloss retention and color retention. What is more, acrylic silicone resin coating materials are excellent in chemical resistance, oil resistance, and water resistance. Acrylic urethane resin coating materials offer soft coating films and are excellent in adhesion, durability, weather resistance, and chemical resistance. These resin coating materials may be used singly, or in combination of two or more thereof.

The undercoat layer is not particularly limited in thickness and preferably has a thickness of about from 5 μm to 25 μm from a viewpoint of ensuring a smooth surface.

In order to enhance adhesion between the undercoat layer and the base material, a primer layer may be disposed between the undercoat layer and the base material.

—Topcoat Layer—

To protect the silver particle layer, a topcoat layer may be disposed on the silver particle layer.

The topcoat layer is a layer that is disposed on the outermost surface of the ornament and makes it easy to protect the silver particle layer.

The topcoat layer preferably has transparency so as not to conceal the silver particle layer and may be colorless and clear (colorless and transparent) or colored but clear (transparent colored).

In forming the topcoat layer, a resin coating material can be used, and a thermosetting resin may be used. Examples of the thermosetting resin include fluororesin coating materials, polyester resin coating materials, epoxy resin coating materials, melamine resin coating materials, silicone resin coating materials, acrylic silicone resin coating materials, and acrylic urethane resin coating materials. It is preferable to use acrylic silicone resin coating materials or acrylic urethane resin coating materials. Acrylic silicone resin coating materials have excellent adhesion to the base material and are excellent in gloss retention, color retention, chemical resistance, oil resistance, and water resistance. Acrylic urethane resin coating materials offer soft coating films and are excellent in adhesion, durability, weather resistance, and chemical resistance. These resin coating materials may be used singly, or in combination of two or more thereof.

The topcoat layer is not particularly limited in thickness and preferably has a thickness of about from 20 μm to 40 μm. With a thickness of 20 μm or more, the topcoat layer tends to protect the silver particle layer sufficiently. With a thickness of 40 μm or less, the topcoat layer is less likely to cause cracks, peeling, adhesion failure, and the like due to aging.

The ornament of the disclosure is excellent in millimeter wave radar transmittance. Accordingly, when being applied to an emblem of a vehicle, the ornament of the disclosure hardly affects performance of a transceiver for millimeter wave radars behind the emblem of the vehicle.

<Silver Mirror Film-forming Liquid>

A silver mirror film-forming liquid of the disclosure includes a water-soluble silver salt solution containing a water-soluble silver salt, ammonia, an amine compound, and an additive; and a reducing agent aqueous solution containing a reducing agent and a strong alkaline component.

Amounts and the like of the water-soluble silver salt, amine compound, and additive contained in the water-soluble silver salt solution are already described above.

Amounts and the like of the reducing agent, strong alkaline component, and another component, if necessary, contained in the reducing agent aqueous solution are already described above.

The use of the silver mirror film-forming liquid of the disclosure can be expanded not only to emblems of vehicles but also to other exterior and interior parts.

EXAMPLE

Hereinafter, Examples of the disclosure will be described, but the disclosure is not limited to the following Examples.

Example 1A (Formation of Undercoat Layer)

A planar polycarbonate base material having a width of 70 mm, a length of 150 mm, and a thickness of 2 mm was prepared. The surface of the base material was degreased and washed with a waste cloth impregnated with isopropyl alcohol (IPA) to remove an oil film, dirt, and dust, followed by drying the base material.

In addition, predetermined amounts of an acrylic resin-type coating material, a diluted thinner, and an isocyanate-type curing agent were blended and stirred so as to prepare a composition for an undercoat layer.

The composition for an undercoat layer prepared was sprayed onto the base material with a spray gun and dried in a drying furnace set at 80° C. for one hour, thereby forming an undercoat layer having an average thickness of 15 μm.

(Formation of Silver Particle Layer)

Pure water was sprayed onto the base material formed with the undercoat layer to wash the base material, and then, a surface activation liquid containing an inorganic tin compound was applied to the base material by spraying. After the base material was sufficiently washed with pure water by spraying, a treatment liquid containing a water-soluble silver salt was applied to perform activation of silver mirror deposition. Two solutions, that is, a water-soluble silver salt aqueous solution to which a compound having a phosphate structure was added and a reducing agent aqueous solution, were applied with a dual head spray gun for a certain period of time, thereby forming a silver particle layer by a silver mirror reaction. Then, spray washing was performed with pure water, a deactivation liquid was applied, and spray washing was performed again with pure water. In order to remove moisture on the surface of the silver particle layer, compressed air was blown (air blowing), and then, the silver particle layer was dried in a drying furnace.

A cross section of the base material formed with the silver particle layer was cut out with a cutter, and the cutout cross section was trimmed with a stainless steel cutter. Then, a cutout piece having an ultrathin cross-section was produced by ultramicrotome using a diamond knife. The cutout piece was captured by a transmission electron microscope (JEM-2100 manufactured by JEOL Ltd.). FIG. 1 shows an example of the obtained electron micrograph. The dotted line in FIG. 1 is a center line passing through the center of the silver particle layer in a thickness direction. The micrograph was captured at 300,000-fold magnification and at beam intensity of 200 kV. The proportion of silver particles in the silver particle layer was determined based on the obtained electron micrograph. The result was 62.8%. In the electron micrograph, note that parts having a relatively low brightness indicate the silver particles. FIG. 1 shows that the island-shaped silver particles are scattered to form a sea-island structure, and the silver particles are stacked in a thickness direction of the silver particle layer.

Furthermore, the surface resistivity of the silver particle layer was measured by a four-probe method using a low resistivity meter (Trade name: Loresta EP, Dia Instruments Co., Ltd.), and the result was $6.8 \times 10^7 \Omega/\square$.

(Formation of Topcoat Layer)

Predetermined amounts of an acrylic resin-type coating material, a diluted thinner, and a curing agent were blended and stirred so as to prepare a composition for a topcoat layer.

The silver particle layer was dried, and then, naturally cooled. When the temperature of the ornament reliably reached room temperature (25° C.), the prepared composition for a topcoat layer was sprayed with a spray gun onto the silver particle layer and dried in a drying furnace set at 80° C. for 30 minutes to form a topcoat layer having an average thickness of 25 μm, thereby obtaining an ornament of Example 1A.

[Evaluation]

—Measurement of Attenuation of Millimeter Wave Transmission—

A millimeter wave (76.575 GHz) was transmitted through the obtained ornament, and attenuation of transmission was measured by the following method. The result was 0.89 dB.

The attenuation of transmission was calculated from a transmitted wave (transmission coefficient) obtained by a free-space method defined in JIS R 1679:2007 (Measurement methods for reflectivity of electromagnetic wave absorber in millimetre wave frequency). In the free-space method, a sample is placed between a transmitting antenna and a receiving antenna, and the sample is vertically irradiated with an electromagnetic wave.

Here, the attenuation of transmission can be calculated by the following equation using the transmission coefficient.

$$\text{Attenuation of transmission} = 20 \log_{10}(\text{transmission coefficient})$$

Comparative Example 1A

An ornament of Comparative Example 1A was obtained in a similar manner to Example 1A except that the compound having a phosphate structure was not added to the water-soluble silver salt aqueous solution when developing a silver mirror reaction.

The ornament obtained was evaluated in a similar manner to Example 1A, and the attenuation was 49.35 dB.

In Comparative Example 1A, silver particles were dense in a layer formed by the silver mirror reaction.

Furthermore, surface resistivity of the layer formed by the silver mirror reaction was measured in a similar manner to Example 1A, and the result was $4.0 \times 10^{-1} \Omega/\square$.

Example 1B

An ornament of Example 1B was obtained in a similar manner to Example 1A except that the time for applying two solutions, the water-soluble silver salt aqueous solution and the reducing agent aqueous solution, by a dual head spray gun was changed to 1.5 times the application time set in Example 1A.

The ornament obtained was evaluated in a similar manner to Example 1A, and the attenuation was 0.929 dB.

In Example 1B, a layer formed by a silver mirror reaction had a sea-island structure scattered with island-shaped silver particles, and the silver particles were stacked in a thickness direction of a silver particle layer.

Furthermore, surface resistivity of the layer formed by the silver mirror reaction was measured in a similar manner to Example 1A, and the result was $2.4 \times 10^{6} \Omega/\square$.

Example 2B

An ornament of Example 2B was obtained in a similar manner to Example 1A except that the time for applying two solutions, the water-soluble silver salt aqueous solution and the reducing agent aqueous solution, by a dual head spray gun was changed to 1.8 times the application time set in Example 1A.

The ornament obtained was evaluated in a similar manner to Example 1A, and the attenuation was 0.912 dB.

In Example 2B, a layer formed by a silver mirror reaction had a sea-island structure scattered with island-shaped silver particles, and the silver particles were stacked in a thickness direction of a silver particle layer.

Furthermore, surface resistivity of the layer formed by the silver mirror reaction was measured in a similar manner to Example 1A, and the result was $8.1 \times 10^{5} \Omega/\square$.

Example 3B

An ornament of Example 3B was obtained in a similar manner to Example 1A except that the time for applying two solutions, the water-soluble silver salt aqueous solution and the reducing agent aqueous solution, by a dual head spray gun was changed to 2.0 times the application time set in Example 1A.

The ornament obtained was evaluated in a similar manner to Example 1A, and the attenuation was 0.917 dB.

In Example 3B, a layer formed by a silver mirror reaction had a sea-island structure scattered with island-shaped silver particles, and the silver particles were stacked in a thickness direction of a silver particle layer.

Furthermore, surface resistivity of the layer formed by the silver mirror reaction was measured in a similar manner to Example 1A, and the result was $5.5 \times 10^{4} \Omega/\square$.

Comparative Example 1B

An ornament of Comparative Example 1B was obtained in a similar manner to Example 1A except that the time for applying two solutions, the water-soluble silver salt aqueous solution and the reducing agent aqueous solution, by a dual head spray gun was changed to 2.2 times the application time set in Example 1A.

The ornament obtained was evaluated in a similar manner to Example 1A, and the attenuation was 1.027 dB.

In Comparative Example 1B, a layer formed by a silver mirror reaction had a sea-island structure scattered with island-shaped silver particles, and the silver particles were stacked in a thickness direction of a silver particle layer.

Furthermore, surface resistivity of the layer formed by the silver mirror reaction was measured in a similar manner to Example 1A, and the result was $2.2 \times 10^{3} \Omega/\square$.

The disclosure of International Application No. PCT/JP2019/024748 filed on Jun. 21, 2019, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. An ornament comprising:
    a base material; and
    a silver particle layer containing silver particles and disposed on the base material,
    wherein the silver particle layer has surface resistivity of $10^{4} \Omega/\square$ or more,
    the silver particles are stacked in the silver particle layer in a thickness direction of the silver particle layer, and the ornament is silver-colored.

2. The ornament according to claim 1, wherein tin is present between the base material and the silver particles.

3. The ornament according to claim 1, wherein the silver particles account for 95% or less of the silver particle layer.

4. The ornament according to claim 1, wherein the silver particles contain precipitated silver particles.

5. The ornament according to claim 1, wherein the silver particle layer has a sea-island structure dotted with island-shaped silver particles.

6. The ornament according to claim 1, wherein an undercoat layer is disposed between the base material and the silver particle layer.

7. The ornament according to claim 1, wherein a topcoat layer is disposed on the silver particle layer.

8. An ornament comprising:
a base material; and
a silver particle layer containing silver particles and disposed on the base material,
wherein the silver particle layer has surface resistivity of $10^7 \Omega/\square$ or more,
the silver particles are stacked in the silver particle layer in a thickness direction of the silver particle layer, and
the silver particle layer has a thickness of from 30 nm to 200 nm.

9. The ornament according to claim 8, wherein tin is present between the base material and the silver particles.

10. The ornament according to claim 8, wherein the silver particles account for 95% or less of the silver particle layer.

11. The ornament according to claim 8, wherein the silver particles contain precipitated silver particles.

12. The ornament according to claim 8, wherein the silver particle layer has a sea-island structure dotted with island-shaped silver particles.

13. The ornament according to claim 8, wherein an undercoat layer is disposed between the base material and the silver particle layer.

14. The ornament according to claim 8, wherein a topcoat layer is disposed on the silver particle layer.

\* \* \* \* \*